(12) United States Patent
Okamoto et al.

(10) Patent No.: US 7,487,281 B2
(45) Date of Patent: Feb. 3, 2009

(54) COMPUTER SYSTEM TO CONTROL THE DATA TRANSFER BETWEEN A MEMORY AND A PERIPHERAL DEVICE CONNECTED TO A CPU VIA A BUS

(75) Inventors: Kazuki Okamoto, Hamamatsu (JP); Tomohiro Suzuki, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 151 days.

(21) Appl. No.: 11/661,526

(22) PCT Filed: Nov. 30, 2005

(86) PCT No.: PCT/JP2005/022021

§ 371 (c)(1),
(2), (4) Date: Feb. 27, 2007

(87) PCT Pub. No.: WO2006/059660

PCT Pub. Date: Jun. 8, 2006

(65) Prior Publication Data

US 2007/0255700 A1    Nov. 1, 2007

(30) Foreign Application Priority Data

Nov. 30, 2004   (JP)   ............... 2004-347312

(51) Int. Cl.
*G06F 13/14* (2006.01)
(52) U.S. Cl. ..................... 710/305; 710/16; 710/33; 710/38; 710/107; 710/316
(58) Field of Classification Search ............... 710/8–19, 710/33–40, 107–110, 305–317
See application file for complete search history.

(56) References Cited

U.S. PATENT DOCUMENTS 6,954,821 B2 * 10/2005 Fitzsimmons et al. ....... 710/317
7,376,777 B2 *  5/2008 Coffee et al. ................ 710/306

FOREIGN PATENT DOCUMENTS

| JP | 50-74349 | 6/1975 |
| JP | 06-332796 | 12/1994 |
| JP | 2002-132580 | 5/2002 |

* cited by examiner

*Primary Examiner*—Raymond N Phan
(74) *Attorney, Agent, or Firm*—Pillsbury Winthrop Shaw Pittman LLP

(57) ABSTRACT

In a computer system that includes a memory, a peripheral device to which an address overlapping with a part of an address space assigned to the memory is assigned, a CPU for sending a signal responding an address of an access destination to a bus when the CPU accesses either the memory or the peripheral device, and a bus for connecting the CPU and the peripheral device, a switch for switching a connection and a disconnection between the CPU and the memory via the bus, and an interface portion for receiving a signal sent to the bus from the CPU and specifying an address indicated by the signal and a decoding portion for turning OFF the switch when the address specified by the interface portion is the address assigned to its own device is provided to the peripheral device.

2 Claims, 3 Drawing Sheets

COMPUTER SYSTEM TO CONTROL THE DATA TRANSFER BETWEEN A MEMORY AND A PERIPHERAL DEVICE CONNECTED TO A CPU VIA A BUS

TECHNICAL FIELD

The present invention relates to the technology to control the data transfer between a memory and a peripheral device connected to a CPU via a bus and the CPU.

BACKGROUND ART

In order to improve throughput of a computer system containing CPU (Central Processing Unit), memory, and the like, for example, improvements in a high integration and a high speed of a semiconductor memory device constituting the memory, particularly DRAM (Dynamic Random Access Memory) are proceeding. As an example of the improvements, such an instance can be offered that a memory should be composed of SDRAM (Synchronous DRAM) that operates in synchronism with a clock supplied from a clock generator to CPU (referred to as a "system clock" hereinafter). Also, various technologies regarding improvements in a structure of SDRAM and its utilizing method have been proposed, and the technology disclosed in Patent Literature 1 can be cited as an example. In this Patent Literature 1, the SDRAM that makes the mixed use of memory modules having different structures possible and the memory system including the same is disclosed.

Patent Literature 1: JP-A-2002-132580

DISCLOSURE OF THE INVENTION

A data transfer rate between a CPU and a memory can be improved by constructing the memory by the above SDRAM. However, in the actual computer system, in some cases the peripheral equipment (also referred to as the "peripheral device" hereinafter) having the logic circuit that is specialized for the particular processing (e.g., the image processing, the speech processing, or the like) in addition to the memory is connected to the CPU. It is common that such peripheral device is connected to CPU via the external bus that is slower in speed than the memory bus to which the memory is connected. Therefore, a data transfer rate between the peripheral device and the CPU causes a bottleneck, and in some cases it is impossible to improve the throughput of the overall computer system.

It seems that such disadvantage can be avoided by connecting the peripheral device to the memory bus that is higher than the external bus. Concretely, it looks as if such disadvantage can be avoided by providing the decoder on the memory bus to connect the peripheral device to the memory via the decoder, and then switching the transfer address of the command (e.g., the command to instruct that the data corresponding to the address is read), which is sent from the CPU together with the address, by this decoder in response to the address sent from the CPU. The reason why such command transfer control should be executed is that, when the command is transferred to both the memory and the peripheral device, the data are read from both the memory and the peripheral device and a data conflict on the memory bus is caused.

Meanwhile, the command sent out from the CPU must be transferred to the memory or the peripheral device within one clock. That is, the decoder must decode the address within one clock (e.g., 7.5 nanosecond when the memory is constructed by SDRAM whose operation clock is 133 MHz) and then transfer the address and the command to the memory or the peripheral device. However, such high-speed device does not exist at present and thus the above decoder cannot be provided on the memory bus.

The present invention has been made in light of the above problem, and aims at providing the technology to settle a conflict between data read from a peripheral device and data read from a memory after the peripheral device is connected to the bus to which the memory has already been connected.

In order to solve the above problems, a computer system according to the present invention includes a CPU, a memory, a peripheral device to which an address overlapping with a part of an address space assigned to the memory is assigned, and a bus which connects the CPU to the peripheral device. The bus has a switch which switches a connection and a disconnection between the CPU and the memory. The CPU sends a signal indicating an address of an access destination to the bus when the CPU accesses either the memory or the peripheral device. The peripheral device includes an interface portion which receives the signal sent to the bus from the CPU and specifies the address indicated by the signal, and a decoding portion which controls the switch to disconnect a connection between the memory and the CPU when the address specified by the interface portion is the address assigned to own device (peripheral device).

According to such computer system, when the peripheral device receives from the CPU the signal to the effect that the access destination is its own device, such device turns OFF the switch. Thus, the memory can be disconnected from the CPU, and thus the data transfer between the CPU and the memory is shut down. Here, when the bus contains the command bus and the data bus, the switch may be provided only onto the data bus. Even in such case, the data transfer between the CPU and the memory can be cut off by controlling the ON/OFF of the switch.

According to the present invention, such an advantage can be achieved that, even after the peripheral device is connected to the bus to which the memory has already been connected, the conflict between data read from the peripheral device and data read from the memory on the bus can be avoided. As a result, the peripheral device can be connected to the memory bus that is higher in speed than the external bus, and a data transfer rate between the CPU and the peripheral device can be improved.

Figure 1:
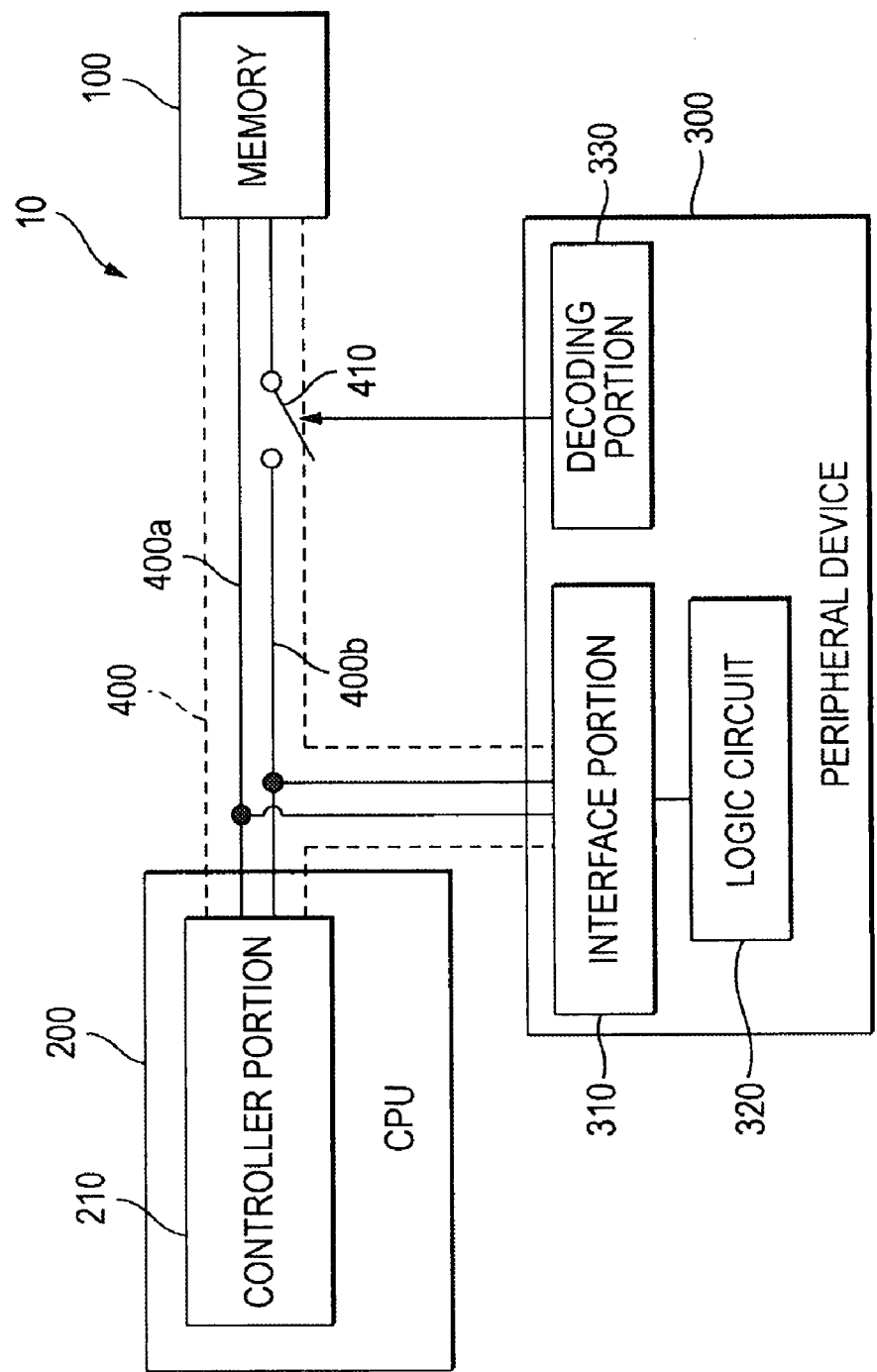
FIG. 1 A block diagram showing a configurative example of a computer system 10 according to an embodiment of the present invention.

DESIGNATION OF REFERENCE NUMERALS AND SIGNS 10 computer system
100 memory
200 CPU
210 controller portion
300 peripheral device
310 interface portion
320 logic circuit
330 decoding portion
400 bus
400a command bus
400b data bus
410 switch

BEST MODE FOR CARRYING OUT THE INVENTION

A best mode for carrying out the present invention will be explained with reference to the drawings hereinafter.

[Configuration]

FIG. 1 is a block diagram showing a configurative example of a computer system 10 according to an embodiment of the present invention. As shown in FIG. 1, this computer system 10 includes a memory 100, a CPU 200, a peripheral device 300, and a bus 400 for transferring data and commands between these constituent elements.

The bus 400 is a memory bus that is operated in synchronism with a system clock, for example. As shown in FIG. 1, the bus 400 contains a command bus 400a and a data bus 400b. Here, the command bus 400a is a bus that is used to transfer an address indicating an access object and a command representing access contents between the memory 100 or the peripheral device 300 and the CPU 200. Also, the data bus 400b is a bus that is used to transfer the processed result of the command or the data as the processed object of the command between the memory 100 or the peripheral device 300 and the CPU 200.

As shown in FIG. 1, in the computer system 10 according to the present embodiment, both the command bus 400a and the data bus 400b has two routes of a first route extending from the CPU 200 to the memory 100 and a second route extending from the CPU 200 to the peripheral device 300. Also, a switch 410 is provided to the data bus 400b within a range from a branch of the first route and the second route to the memory 100. In the computer system 10 according to the present embodiment, although details will be described later, the data transfer executed between the memory 100 and the CPU 200 via the data bus 400b can be cut off by turning OFF the switch 410.

For example, the memory 100 is a SDRAM whose operation clock is 133 MHz and whose CAS latency (CAS latency: the number of clocks required when the memory starts to send the concerned data after the memory receives the data read command) is 2, and has a plurality of memory areas to which individual addresses (also referred to as the "memory addresses" hereinafter) are allocated respectively. In the present embodiment, any one from "0xA000_0000" to "0xA1FF_FFFF" is allocated to respective memory areas as the memory address (where a prefix "0x" represents that a subsequent value is a hexadecimal digit). In the following, a set of memory addresses allocated to respective memory areas of the memory 100 is also called an "address space". In the present embodiment, the case where the memory 100 is constructed by the SDRAM whose operation clock is 133 MHz and whose CAS latency is 2 will be explained hereunder. But the memory 100 may be of course constructed by the SDRAM having different performances (e.g., a SDRAM whose operation clock is 100 MHz, or a SDRAM whose CAS latency is 3).

As shown in FIG. 1, the CPU 200 contains a controller portion 210, and this controller portion 210 is connected to the bus 400. This controller portion 210 is provided to write the data into the memory 100 via the bus 400 or read the data from the memory 100, and sends out a signal representing the address of the data as the access object or the command corresponding to the access contents to the command bus 400a. The CPU 200 can access respective memory areas of the memory 100 by operating the controller portion 210 appropriately. Also, although details will be described later, the CPU 200 can access the peripheral device 300 by operating the controller portion 210 appropriately.

Figure 2:
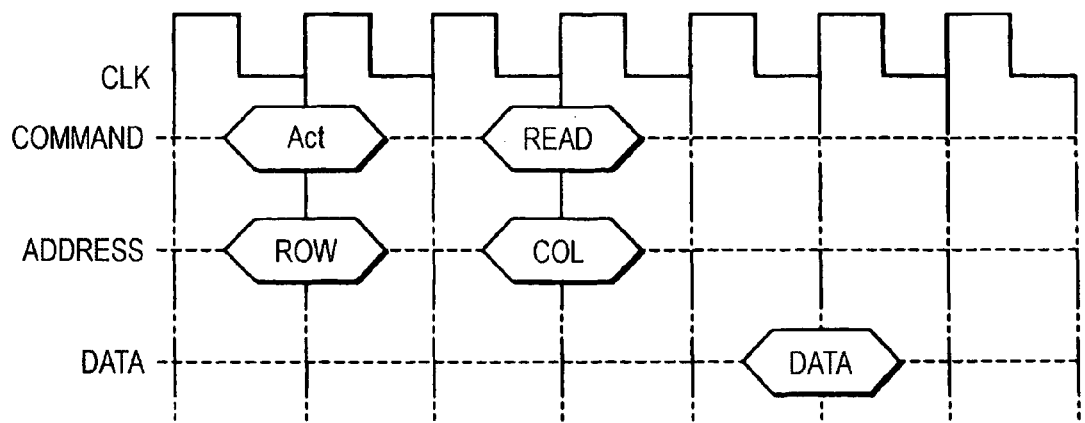
FIG. 2 A sequence diagram representing sequences applied when data are read from a memory 100 as a constituent element of the computer system 10.

For example, when the data stored in the memory 100 are to be read, the CPU 200 sends out a signal described hereunder at a timing shown in FIG. 2. That is, first the CPU 200 sends out a signal representing an active command (indicated as "Act" in FIG. 2) or a row address (indicated as "ROW" in FIG. 2) to the command bus 400a. Then, the CPU 200 makes space in a clock interval responding to specifications of the controller portion 210 (e.g., 2 clock), and then sends out a signal representing a read command (indicated as "READ" in FIG. 2) or a column address (indicated as "COL" in FIG. 2) to the command bus 400a. In FIG. 2, CLK represents the system clock supplied from the clock generator.

Figure 3:
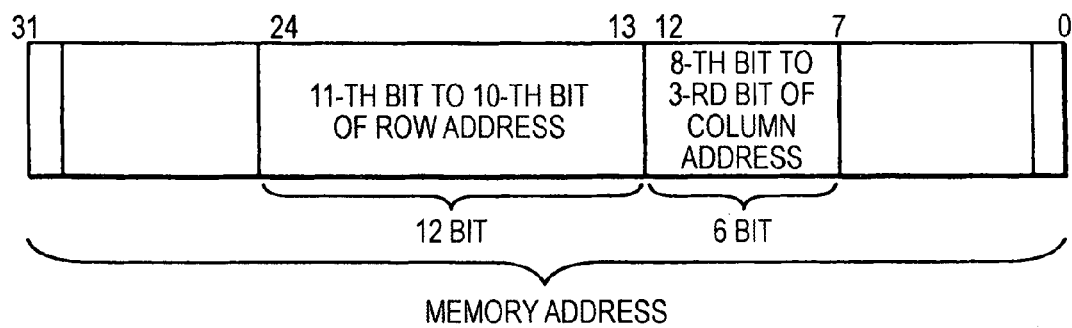
FIG. 3 A view showing an example of relationships between a memory address assigned to respective memory areas of the memory 100 and a row address and a column address.

The row address and the column address in FIG. 2 are the address used to specify the memory area of the memory 100 at a memory element (memory element consisting of one transistor and one capacitor) level constituting the memory 100. When explaining in more detail, a plurality of word lines, a plurality of digit lines, and a plurality of memory elements arranged in positions corresponding intersections between these word lines and these digit lines are contained in the memory 100. The word line is specified by addressing the row address, and the digit line is specified by addressing the column address. That is, the memory element arranged at the intersection between them is specified by addressing the row address and the column address. In the computer system 10 according to the present embodiment, there are relationships as shown in FIG. 3 between the row address and the column address and the memory address. More particularly, the row addresses from the 11-th bit to the 0-th bit correspond to the memory addresses of 12 bits from the 24-th bit to the 13-rd bit, and also the column address from the 8-th bit to the 3-rd bit correspond to the memory addresses of 6 bits from the 12-th bit to the 7-th bit. In the present embodiment, the case where the row address and the column address and the memory address have correlations shown in FIG. 3 will be explained hereunder. The correlations between the row address and the column address and the memory address are decided in response to a memory capacity of SDRAM and the specifications of the controller portion 210 in the CPU 200, and the correlations are not limited to the correlations shown in FIG. 3.

The active command in FIG. 2 is a command indicating that the word line specified by the row address that is transferred together with this active command should be selected. The read command in FIG. 2 is a command indicating that the digit line specified by the column address that is transferred together with this read command should be selected to read the data being held in the memory element that corresponds to the intersection between the previously selected word line and the digit line. As shown in FIG. 2, when the memory 100 receives the active command and the read command sequentially, the memory 100 sends out the data held in the memory element, which is specified by the row address received together with the active command and the column address received together with the read command, to the data bus 400b at a timing responding to the CAS latency of the memory 100. In this manner, when the CPU 200 receives the data sent out to the data bus 400b from the memory 100, this CPU 200 can read the data stored in the memory 100.

Figure 4:
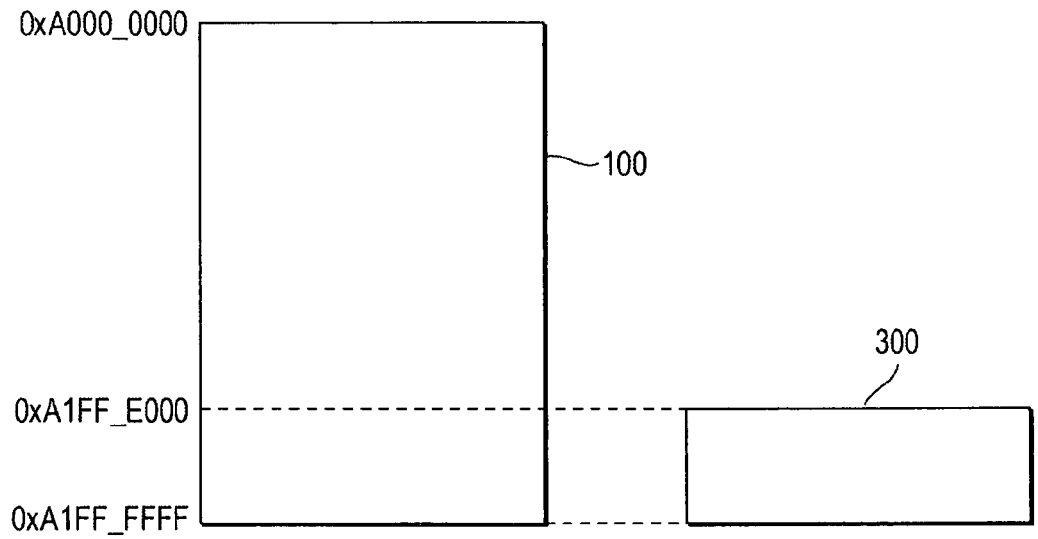
FIG. 4 A view explaining a relationship between an address space assigned to the memory 100 and an address assigned to a peripheral device 300.

The peripheral device 300 shown in FIG. 1 is FPGA (Field Programmable Gate Array), for example, and has an interface portion 310, a logic circuit 320, and a decoding portion 330. In the present embodiment, as shown in FIG. 4, the addresses a part of which overlaps with the address space assigned to the memory areas in the memory 100 are assigned to the peripheral device 300. Concretely, as shown in FIG. 4, an address range from "0xA1FF_E000" to "0xA1FF_FFFF" is assigned to the peripheral device 300. In the present embodiment, the doubly assigned addresses are not utilized as the address representing the memory area of the memory 100 but as the address representing the memory area of the peripheral device 300. That is, the memory 100 cannot utilize the memory areas, to which the memory addresses that overlap with the addresses assigned to the peripheral device 300 are assigned, among all memory areas. However, such memory areas occupy merely several percent of all memory areas of the memory 100, and no exceptional problem arises.

The interface portion 310 is a SDRAM interface, for example, and is connected to the bus 400. This interface portion 310 receives a signal supplied from the CPU 200 via the bus 400, and then transfers the address (i.e., the row address or the column address) or the command represented by this signal to the logic circuit 320 or the decoding portion 330. The logic circuit 320 is an electronic circuit that executes the previously programmed process (e.g., the image processing, the speech processing, or the like), and executes the processing in answer to the address or the command transferred from the interface portion 310. Also, the decoding portion 330 is connected to the switch 410 via the signal line, as shown in FIG. 1, and controls ON/OFF of the switch 410 in response to a value of the row address transferred from the interface portion 310. A switch controlling operation that the decoding portion 330 executes will be explained in detail hereunder.

[Operation]

Figure 5:
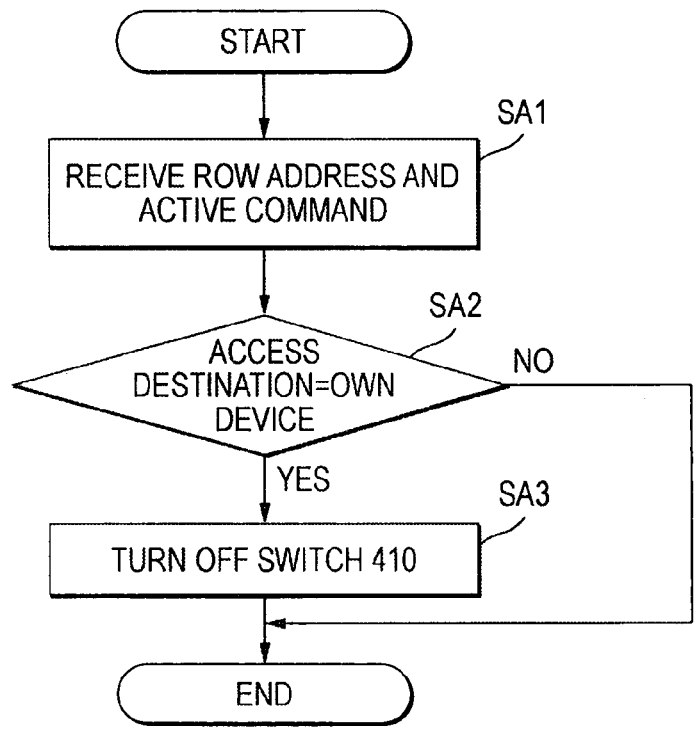
FIG. 5 A flowchart showing a flow of a switch controlling operation that a decoding portion 330 of the peripheral device 300 executes.

FIG. 5 is a flowchart showing a flow of the switch controlling operation that the decoding portion 330 executes. As shown in FIG. 5, the decoding portion 330 receives the active command and the row address from the interface portion 310 (step SA1). Then, the decoding portion 330 decides whether or not the access destination of the CPU 200 corresponds to its own device (i.e., the peripheral device 300), based on a value of the row address (step SA2). When explaining in more detail, in the present embodiment, the addresses from "0xA1FF_E000" to "0xA1FF_FFFF" are assigned to the peripheral device 300 (see FIG. 4). Also, the relationships shown in FIG. 3 are present between the addresses assigned to the peripheral device 300 and the memory address and the row address. Therefore, all the row addresses from the 11-th bit to the 0-th bit, which correspond to the addresses assigned to the peripheral device 300, are set to 1. That is, the access destination of the CPU 200 is the peripheral device 300 when the 11-th bit to the 0-th bit of the row address sent from the CPU 200 are all 1 (i.e., 1111_1111_1111), while the access destination of the CPU 200 is the memory area in the memory 100 when the 11-th bit to the 0-th bit of the row address are different from the above bit pattern. In the present embodiment, the CPU 200 causes the decoding portion 330 to decide the access destination of the CPU 200 by utilizing this event. In other words, the decoding portion 330 decides that the access destination of the CPU 200 is its own device when the 11-th bit to the 0-th bit of the row address transferred from the interface portion 310 are all 1, and decides that the access destination of the CPU 200 is the memory 100 when the row address pattern is different from the above pattern.

Then, when the decision result in step SA2 is "YES" (i.e., the decoding portion 330 decides that the access destination is its own device), the decoding portion 330 outputs a control signal to turn OFF the switch 410 (step SA3). As a result, the switch 410 is turned OFF, and the data transfer between the memory 100 and the CPU 200 is cut off.

A noticeable point of the present embodiment is that the decoding portion 330 does not switch the transfer destination of the command in response to a value of the row address, but controls ON/OFF of the switch 410 in response to a value of the row address to shut down the data transfer between the memory 100 and the CPU 200.

More particularly, in the computer system 10 according to the present embodiment, the active command and the row address and the real command and the column address sent out from the CPU 200 are transferred to both the memory 100 and the peripheral device 300, and then both devices try to send out the concerned data respectively. However, when the access to the peripheral device 300 is issued, the switch 410 is turned OFF until the sending of the data from the memory 100 is started, and thus the data transfer between the memory 100 and the CPU 200 is cut off. Therefore, the foregoing data conflict can be avoided.

As described above, it is impossible to switch the transfer destination of the command in response to a value of the row address. However, like the computer system 10 according to the present embodiment, when such a mode is employed that the ON/OFF control of the switch 410 is carried out in response to a value of the row address to cut off the data transfer between the memory 100 and the CPU 200, the switch 410 may be turned OFF within a time (4 clocks in the present embodiment) required when the memory 100 starts to send the data after the memory 100 receives the row address. Therefore, such situation can be realized sufficiently in practical use. In the present embodiment, the case where the CPU 200 reads the data from the peripheral device 300 is explained. In the case where the data are written into the peripheral device 300 (i.e., in case the CPU 200 sends out the write command instead of the read command), the decoding portion 330 may execute the ON/OFF control of the switch 410 in response to a value of the row address that is sent prior to the write command.

As explained above, in the computer system 10 according to the present embodiment, even after the peripheral device 300 is connected to the bus 400, a conflict between the data sent to the CPU 200 from the memory 100 and the data sent to the CPU 200 from the peripheral device 300 can be avoided. As a result, the peripheral device 300 can be connected to the memory bus that is higher in speed than the external bus, and a data transfer rate between the CPU 200 and the peripheral device 300 can be improved.

[Variations]

One embodiment of the present invention is explained as above. But it is of course that variations described as follows may be applied to such embodiment.

(1) In the above embodiment, the case where the CPU causes the decoding portion 330 to control the ON/OFF of the switch 410 in response to the value of the row address is explained. The reason why the ON/OFF of the switch 410 is controlled by using only the value of the row address is that, when the ON/OFF of the switch 410 is controlled by the value of the column address as well as the value of the row address in the case where the memory 100 is constructed by the SDRAM whose CAS latency is 2, the data transfer from the memory 100 is started before the switch 410 is turned OFF, so that a data conflict is caused.

However, when the memory 100 is constructed by the SDRAM whose CAS latency is longer (i.e., the SDRAM that needs a long time to start the output of the concerned data after it receives the read command and the column address), for example, the ON/OFF of the switch 410 may be controlled by adding the column address and the access contents (i.e., the command sent out from the CPU 200 together with the column address). For example, the switch 410 may be kept OFF when the access contents to the peripheral device 300 is the data reading (i.e., the read command is sent), and the switch 410 may be kept ON when the access contents is the data writing (i.e., the write command is sent). The reason will be given as follows. That is, if the switch 410 is not turned OFF and thus the memory 100 is not separated from the CPU 200 when the write command is sent, the data fed from the CPU 200 is written into both the memory 100 and the peripheral device 300. Even though the data is written into both the memory 100 and the peripheral device 300 in this manner, the above data conflict is not caused on the bus 400 and no exceptional problem arises.

(2) In the above embodiment, such a case is explained that the switch 410 is provided on the first route of the data bus 400b and then the data transfer between the memory 100 and the CPU 200 via the data bus 400b is shut off by turning OFF the switch 410 when the access to the peripheral device 300 is issued, so that the above data conflict is avoided. However, the switch 410 may be provided to both the command bus 400a and the data bus 400b to separate completely the memory 100 from the CPU 200. In this case, an operation of turning ON the switch 410 again, an operation of releasing the active state (state in which the data line is selected in response to the row address) of the memory 100, or the like is needed at a time point when a predetermined time has elapsed after the switch 410 is turned OFF. The reason for executing such processing is that the case where the access to the memory 100 is issued after the access to the peripheral device 300 must be handled.

(3) In the above embodiment, the case where the memory 100 is constructed by the SDRAM is explained. But any memory may be employed if such memory needs a predetermined time to start the sending of the concerned data after such memory goes to its active state.

(4) In the above embodiment, the case where one branch is provided to the bus 400 used to transfer the data between the CPU 200 and the memory 100 and one peripheral device is connected thereto is explained. However, the number of the peripheral devices connected to the branch of the bus 400 is not limited to one, and a plurality of peripheral devices may be of course connected. In this case, it is needless to say that the address corresponding the individual row address must be assigned to respective peripheral devices.

The present invention is explained in detail with reference to particular embodiment. But it is apparent for those skilled in the art that various variations and modifications can be applied without departing from a spirit and a scope of the present invention.

This application is based upon Japanese Patent Application (Patent Application No. 2004-347312) filed on Nov. 30, 2004; the contents of which are incorporated herein by reference.

INDUSTRIAL APPLICABILITY

According to the present invention, such an advantage can be achieved that, even after the peripheral device is connected to the bus to which the memory has already been connected, the conflict between data read from the peripheral device and data read from the memory on the bus can be avoided. Therefore, the peripheral device can be connected to the memory bus that is higher in speed than the external bus, and a data transfer rate between the CPU and the peripheral device can be improved.

The invention claimed is:

1. A computer system, comprising:
  a CPU;
  a memory;
  a peripheral device to which an address overlapping with a part of an address space assigned to the memory is assigned; and
  a bus which connects the CPU to the peripheral device,
  wherein the bus has a switch which switches a connection and a disconnection between the CPU and the memory;
  wherein the CPU sends a signal indicating an address of an access destination to the bus when the CPU accesses either the memory or the peripheral device; and
  wherein the peripheral device includes:
    an interface portion which receives the signal sent to the bus from the CPU and specifies the address indicated by the signal; and
    a decoding portion which controls the switch to disconnect a connection between the memory and the CPU when the address specified by the interface portion is the address assigned to the peripheral device.

2. The computer system according to claim 1, wherein the bus includes a data bus to transfer a data, and a command bus to transfer a command representing access contents; and
  wherein the switch is provided on the data bus.

* * * * *